United States Patent
Au et al.

(10) Patent No.: US 8,326,050 B2
(45) Date of Patent: Dec. 4, 2012

(54) METHOD AND APPARATUS FOR SUBPIXEL-BASED DOWN-SAMPLING

(75) Inventors: Oscar Chi-Lim Au, Hong Kong (HK); Lu Fang, Hong Kong (HK); Hon Wah Wong, Hong Kong (HK); Yi Yang, Hong Kong (HK); Yan Huo, Shenzhen (CN)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 1013 days.

(21) Appl. No.: 12/326,593

(22) Filed: Dec. 2, 2008

(65) Prior Publication Data

US 2010/0135588 A1 Jun. 3, 2010

(51) Int. Cl.
*G06K 9/36* (2006.01)
(52) U.S. Cl. .................. 382/232; 382/239; 382/254
(58) Field of Classification Search .................. None
See application file for complete search history.

(56) References Cited

U.S. PATENT DOCUMENTS

| 6,249,549 | B1 * | 6/2001 | Kim ..................... 375/240.21 |
| 6,608,632 | B2 | 8/2003 | Daly et al. .................... 345/698 |
| 7,349,028 | B2 * | 3/2008 | Neuman et al. .............. 348/448 |
| 2006/0074653 | A1 * | 4/2006 | Mitari et al. ................. 704/240 |

OTHER PUBLICATIONS

Kim and Kim, "A filter design algorithm for subpixel rendering on matrix displays," EUSIPCO, pp. 1487-1491, 2007.*
Sing Bing Kang; , "Automatic Removal of Chromatic Aberration from a Single Image," Computer Vision and Pattern Recognition, 2007. CVPR '07. IEEE Conference on , vol., no., pp. 1-8, Jun. 17-22, 2007 doi: 10.1109/CVPR.2007.383214 URL: http://ieeexplore.ieee.org/stamp/stamp.jsp?tp=&arnumber=4270239&isnumber=4269956.*
Betrisey et al., "Displaced filtering for patterned displays," *SIDS Symposium Digest of Technical Papers*, 30:296-299, 2000.
Gibson, "Sub-Pixel font rendering technology," http://www.grc.com/cleartype.htm, Gibson Research Corporation, copyright 2008.
Messing and Daly, "Improved display resolution of subsampled colour images using subpixel addressing," *IEEE ICIP*, 1:625-628, 2002.
Platt, "Optimal filtering for patterned displays," *IEEE Signal Processing Letters*, 7(7):179-181, 2000.

* cited by examiner

*Primary Examiner* — Atiba O Fitzpatrick
*Assistant Examiner* — Thomas A James
(74) *Attorney, Agent, or Firm* — Ella Cheong; Sam T. Yip

(57) ABSTRACT

This invention relates to method and apparatus for subpixel-based down-sampling. This invention implements an adaptive filter 140 based on edge detection, which removes visible color fringing artifacts while efficiently retaining sharpness.

6 Claims, 6 Drawing Sheets

METHOD AND APPARATUS FOR SUBPIXEL-BASED DOWN-SAMPLING

RELATED APPLICATION

There are no related applications.

TECHNICAL FIELD

The claimed invention relates generally to image signal processing. In particular, the claimed invention relates to image display and down-sampling an image to fit a smaller display, software applications, transmission or user requirements. More specifically, the claimed invention targets subpixel-based down-sampling for RGB displays.

SUMMARY OF THE INVENTION

An image is made up of pixels. It is possible to downsize an image in a manner that the number of pixels for representing the image is reduced. Reducing the number of pixels is performed through a process of down-sampling.

During down-sampling, not all pixels of the original image are retained but only part of them, this incurs severe aliasing artifacts in regions with high spatial frequencies and destroys the shape information by causing thin lines to be broken/discontinuous and edges to exhibit staircase artifacts.

Each pixel in common color LCD display is actually composed of individual addressable red, green, and blue sub-pixel stripes. Using subpixel-based rendering can increase the apparent resolution of an image for display. Because the number of sub-pixels is three times larger than that of pixels, using subpixel-based rendering can reduce staircase artifacts effectively and reconstructs the shape information more faithfully. Therefore, it is possible to perform subpixel-based down-sampling to enhance the visual quality. However, color fringing artifacts will be perceived for some pixels, because not all red, green, blue subpixels are turned on.

Furthermore, the low-pass filtering in subpixel-based rendering relieves the coloring at the cost of image blurring, and can be only adopted as an enhancement technique for an achromatic (grey-scale) image. The same blurring issue is present for subpixel-based down-sampling.

In order to reduce the difference between the original image and image rendered in sub-pixel manner, an error metric is defined in the frequency domain, and a filter is designed by deriving filter coefficients to minimize this error metric. However, these methods can only process down-sampling in the horizontal direction. If vertical down-sampling is also considered, the performances will degrade substantially.

The claimed invention relates to a subpixel-based down-sampling method. The subpixel-based down-sampling method suppresses color fringing artifacts and blurring by an adaptive filter based on edge detection. The subpixel-based down-sampling method provides an optimal cutoff frequency for the adaptive filter to obtain extra information. The subpixel-based down-sampling method allows down-sampling in one or more directions rather than only in a horizontal direction, which has not been addressed before. This allows shape details in all directions to be preserved.

It is an object of the claimed invention to eliminate color fringing artifacts. The existing methods only allow subpixel-based down-sampling in a horizontal direction, or else the visual quality will be substantially degraded. However, this will leads to color fringing artifacts if there is an edge represented in the image displayed, as would be the case if the RGB subpixels for pixels on left-hand side of the edge have a value of 255, i.e. white in color while the RGB subpixels for pixels on right-hand side of the edge have a value of 0, i.e. black in color. After horizontal subpixel-based down-sampling which only adopts the R subpixel on the left and the G and B subpixels on the right, a resulting pixel of RGB value of (255, 0, 0) is generaetd which is red in color. This color does not exist in the original image and thus causes the color fringing artifacts. Since the claimed invention takes into consideration the edge and applies the anti-aliasing filter adaptively in different directions based on the edge detection results, the color fringing artifacts are either eliminated or at least minimized, if not entirely eliminated, while preserving as much information as possible.

It is a further object of the claimed invention to reduce the blurring and preserve information of the image. An optimal cutoff frequency for the anti-aliasing filter is defined in the claimed invention which is both novel and higher than the well-recognized cutoff frequency. The anti-aliasing filter in the claimed invention not only eliminates most of color fringing but also gives a sharper result than the traditional anti-aliasing filter.

Other aspects of the claimed invention are also disclosed.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

Figure 1:
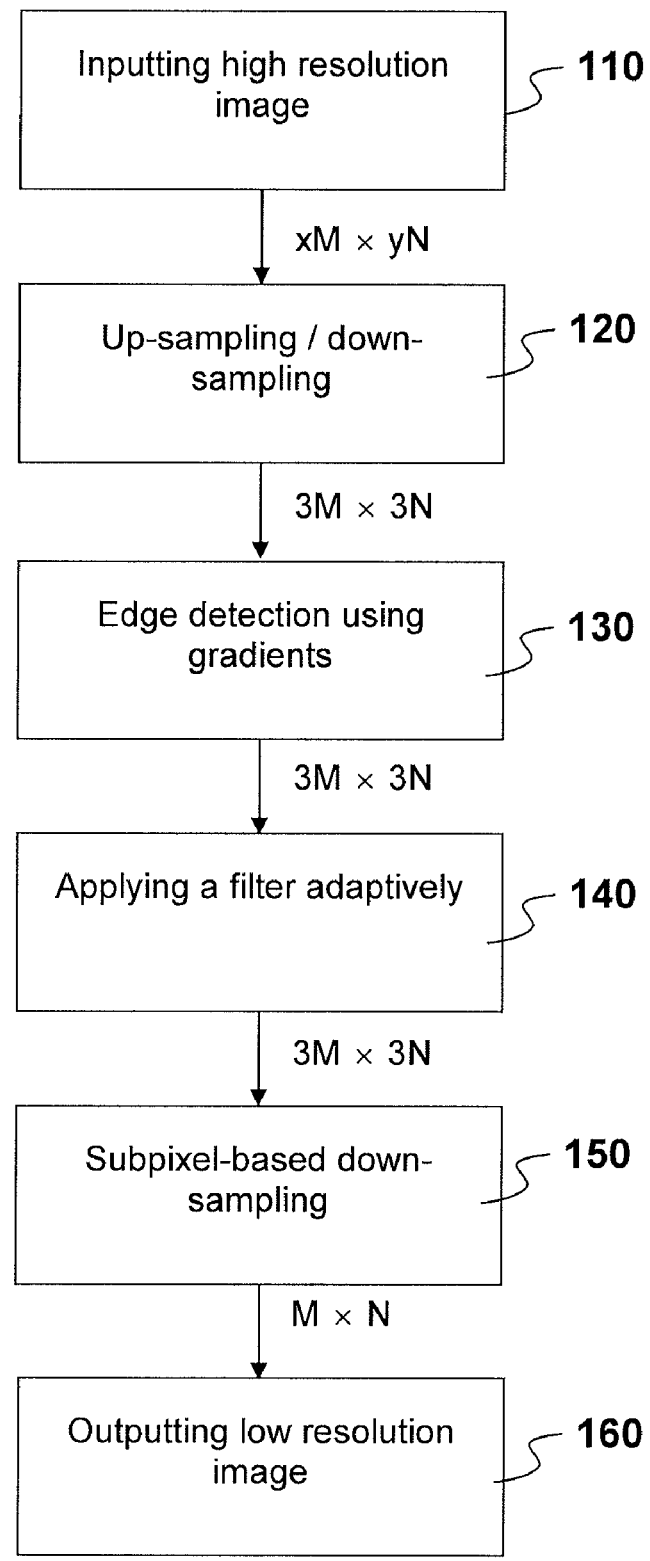
FIG. 1 shows a flowchart of an embodiment of the claimed invention.

FIG. 1 shows a flowchart of how subpixel-based down-sampling in the claimed invention is performed in an illustrative embodiment. In an embodiment, the desired size of an image is M×N, having M pixels in a horizontal direction and N pixels in a vertical direction. The original size of an image is xM×yN, whereas x and y are real numbers which result in either multiples or fractions of M and N.

In an embodiment, a high resolution image is input in inputting step 110. Subsequently, in sampling step 120, the xM×yN image is processed by either up-sampling or down-sampling or both to generate a 3M×3N image. In alternate and equally foreseeable embodiments, slightly different dimensions such as (3M+1)×(3M+1), or (3M+2)×(3M+2), or even (3M+1)×(3M−2) are equally implementable. In edge-detection step 130, the edges in the 3M×3N image is identified which may or may not use gradient. The edge direction is also determined. In an adaptive filtering step 140, different filters are applied for according to the edge direction. In subpixel down-sampling step 150, R-subpixel, G-subpixel and B-subpixel are selected from 3 pixels in the 3M×3N image respectively to give the RGB information of a pixel in an M×N image. The M×N image is output in outputting step 160.

Figure 2A:
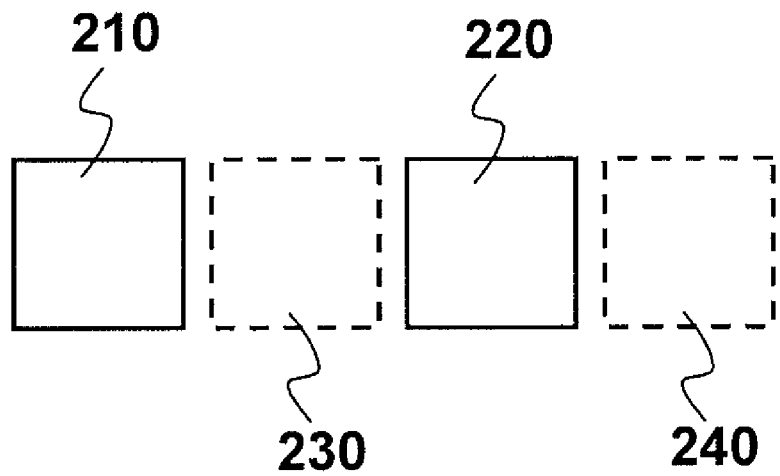
FIG. 2 shows an embodiment of up-sampling and down-sampling.
Figure 2B:
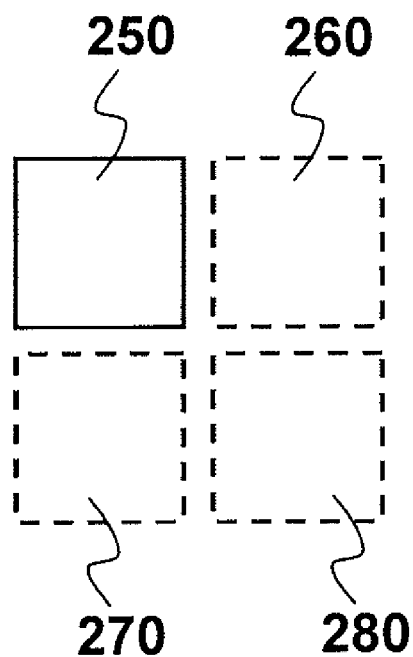

FIGS. 2(a) and 2(b) show an embodiment of the sampling step where up-sampling is done by interpolation. In the FIG. 2(a) illustration, one additional pixel 230, 240 with the same intensity value is padded adjacent to each original pixel 210, 220 along each row to double the size of an image in the horizontal direction. Additional pixels can be padded in any direction in any quantity. In an embodiment, down-sampling is done by sampling. In FIG. 2(*b*), only the pixel 250 at the left-handed corner of every 2×2 square block in an image is sampled to generate a new image. All other remaining pixels 260, 270, 280 are discarded. In this manner, the image is down-sampled by half in both the horizontal direction and the vertical direction. In general, the intensity value of each pixel to be added or to be sampled is selected in a way to preserve the visual quality.

Figure 3:
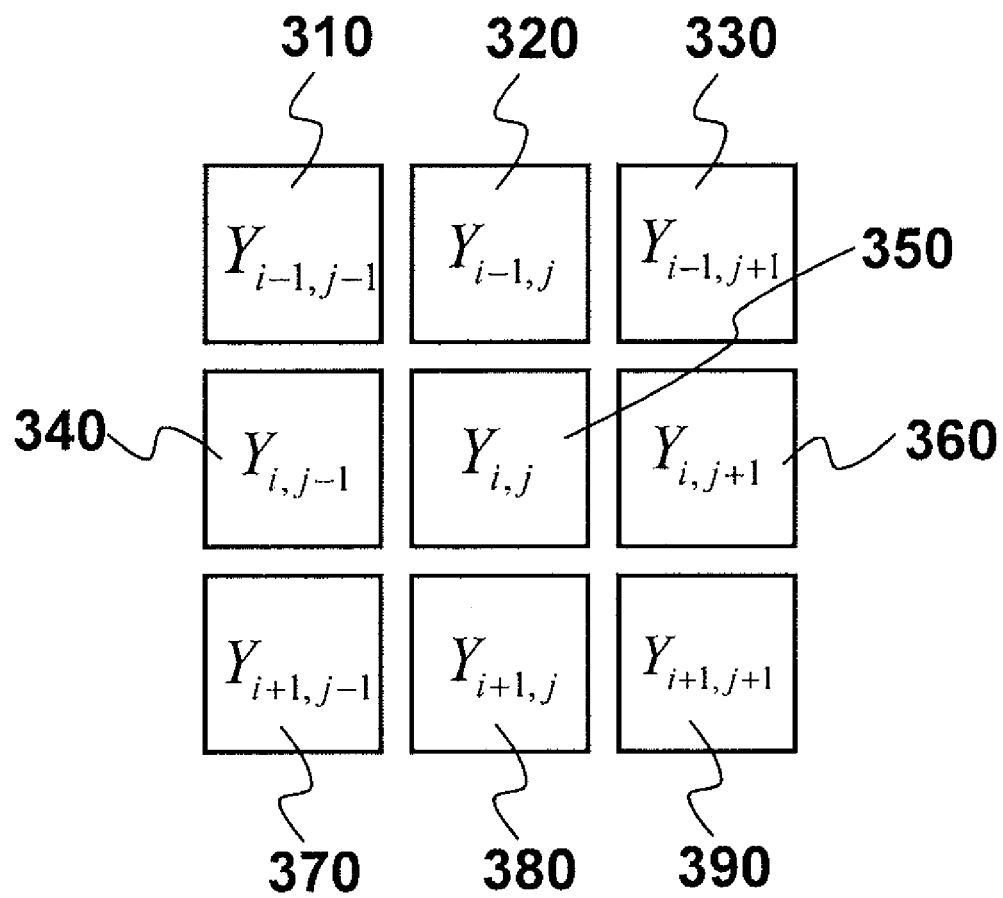
FIG. 3 shows an embodiment of edge-detection.

FIG. 3 shows an embodiment of the edge-detection step. In an edge-detection step illustrative example, the luminance $Y_{i,j}$ of each pixel 350 at (i,j) in an image is used to determine edge information by comparing with the luminance of its neighboring pixels at (i−1,j−1) 310, (i−1,j) 320, (i−1,j+1) 330, (i,j−1) 340, (i,j+1) 360, (i+1,j−1) 370, (i+1,j) 380 and (i+1,j+1) 390. Four directions are defined and include horizontal, vertical, left diagonal and right diagonal. The gradient along the horizontal direction is defined in the equation (1):

$$\text{Grad}_H(Y_{i,j}) = |Y_{i,j-1} - Y_{i,j}| + |Y_{i,j+1} - Y_{i,j}| \quad (1)$$

The gradient along the vertical direction is defined in the equation (2):

$$\text{Grad}_V(Y_{i,j}) = |Y_{i-1,j} - Y_{i,j}| + |Y_{i+1,j} - Y_{i,j}| \quad (2)$$

The gradient along the left diagonal direction is defined in the equation (3):

$$\text{Grad}_{LD}(Y_{i,j}) = |Y_{i-1,j-1} - Y_{i,j}| + |Y_{i+1,j+1} - Y_{i,j}| \quad (3)$$

The gradient along the right diagonal is defined in the equation (4):

$$\text{Grad}_{RD}(Y_{i,j}) = |Y_{i-1,j+1} - Y_{i,j}| + |Y_{i+1,j-1} - Y_{i,j}| \quad (4)$$

Gradient along each direction represents the rate of change in luminance along that particular direction. The larger the gradient along a particular direction is, the more significant the edge along that particular direction will be. In the illustrated embodiment, the edge direction is determined by comparing the gradient values along different directions and finding the one with maximum gradient. The edge direction is orthogonal (90 degrees) to the direction which gives the largest gradient. To compute the gradient for pixel (i,j) 350, various filters are also applicable including Roberts operators, Prewitt operators and Sobel operators and many other operators are also available to determine gradients in different directions.

Figure 4A:
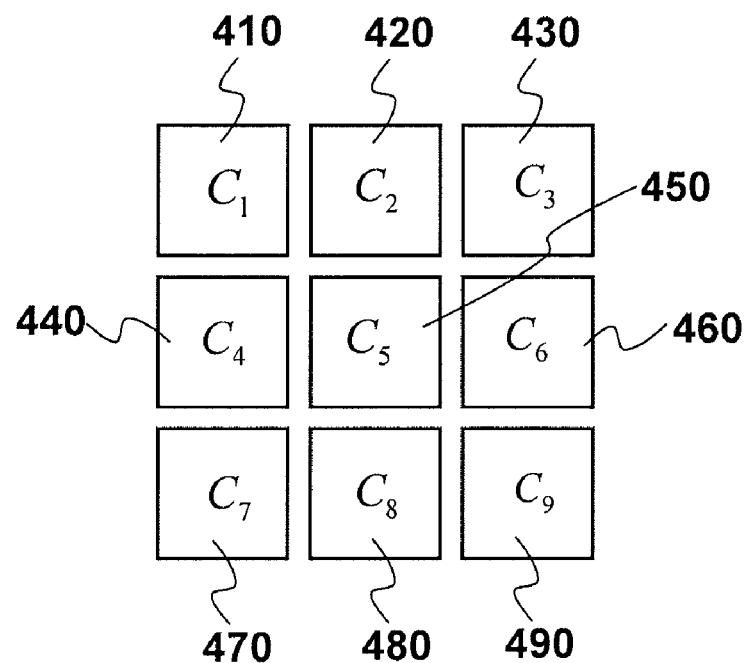
FIG. 4 shows an embodiment of an anti-aliasing filter applied adaptively.
Figure 4B:
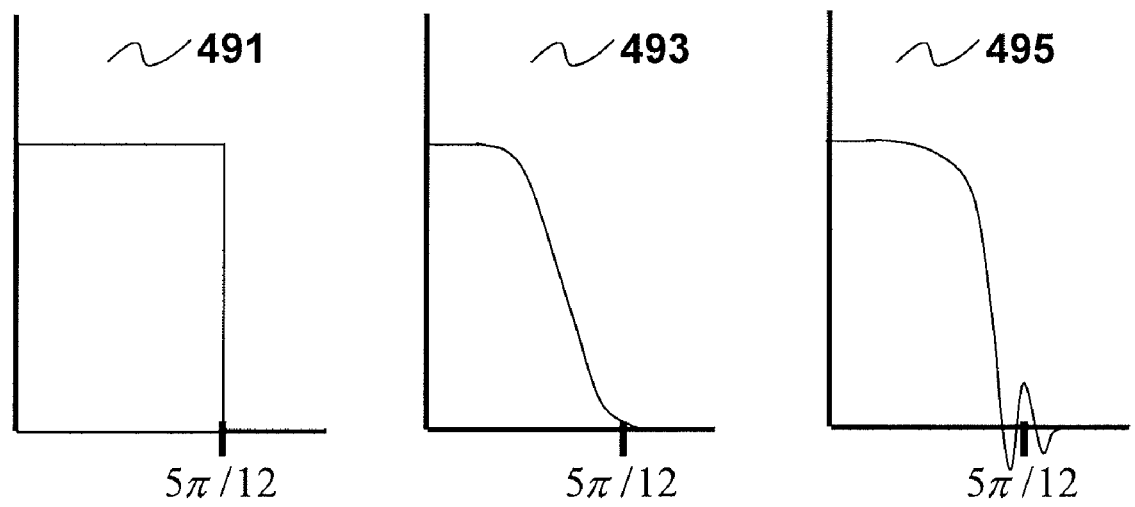

FIG. 4(*a*) shows an embodiment of an anti-aliasing filter which is applied adaptively with channel elements 410, 420, 430, 440, 450, 460, 470, 480 and 490. An anti-aliasing filter is required for each directional channel. Theoretically, for a monochrome image (i.e., R=G=B=Y, U=V=0), the sampling rate of subpixel-based down-sampling is 1.5 cy/display pixel, which is three times of pixel-based down-sampling which is 0.5 cy/display pixel. Using subpixel-based down-sampling could efficiently keep all luminance information under the condition that R=G=B. However, for a full color image, the sampled Y component is determined by two parts: original Y component and original UV components. Due to the aliasing caused by UV components, subpixel-based down-sampling cannot reach three times improvement in sampling rate. It is a tradeoff between luminance information and chrominance aliasing. Since human eyes are more sensitive to luminance than to chrominance, luminance in general dominates the perceived resolution.

Traditionally, the cutoff frequency of the filter is chosen to be π/3. Based on the claimed invention and above arguments, the cutoff frequency is extended somewhere between π/3 and π to obtain extra-luminance information while being free of chrominance distortion. Under optimization, the best cutoff frequency is 5π/12. An embodiment of the anti-aliasing filter is a low pass filter in an infinite sinc function in spatial domain and the main lobe is taken as the anti-aliasing filter. In another embodiment, the anti-aliasing filter in use is a 9-tap filter. In FIG. 4(*b*), various filters 491, 493, 495 as implemented in different embodiments are shown in the frequency domain for the antialiasing filter. It is not necessary to have a sharp cutoff frequency at 5π/12 as in filters 493 and 495. Overshoots are also possible in the antialiasing filter as in the filter 495. The frequency profiles vary among different embodiments of the antialiasing filter as long as they remain to be low pass filters.

Furthermore, the anti-aliasing filter is applied adaptively based on the edge direction. The anti-aliasing filter is applied in a direction orthogonal to the edge direction. For example, if the edge direction is vertical, for example the subpixel values in left-hand side are very different from those in right-hand side, then the anti-aliasing filter is applied in a horizontal direction. The red, green and blue channels are processed separately.

Figure 5:
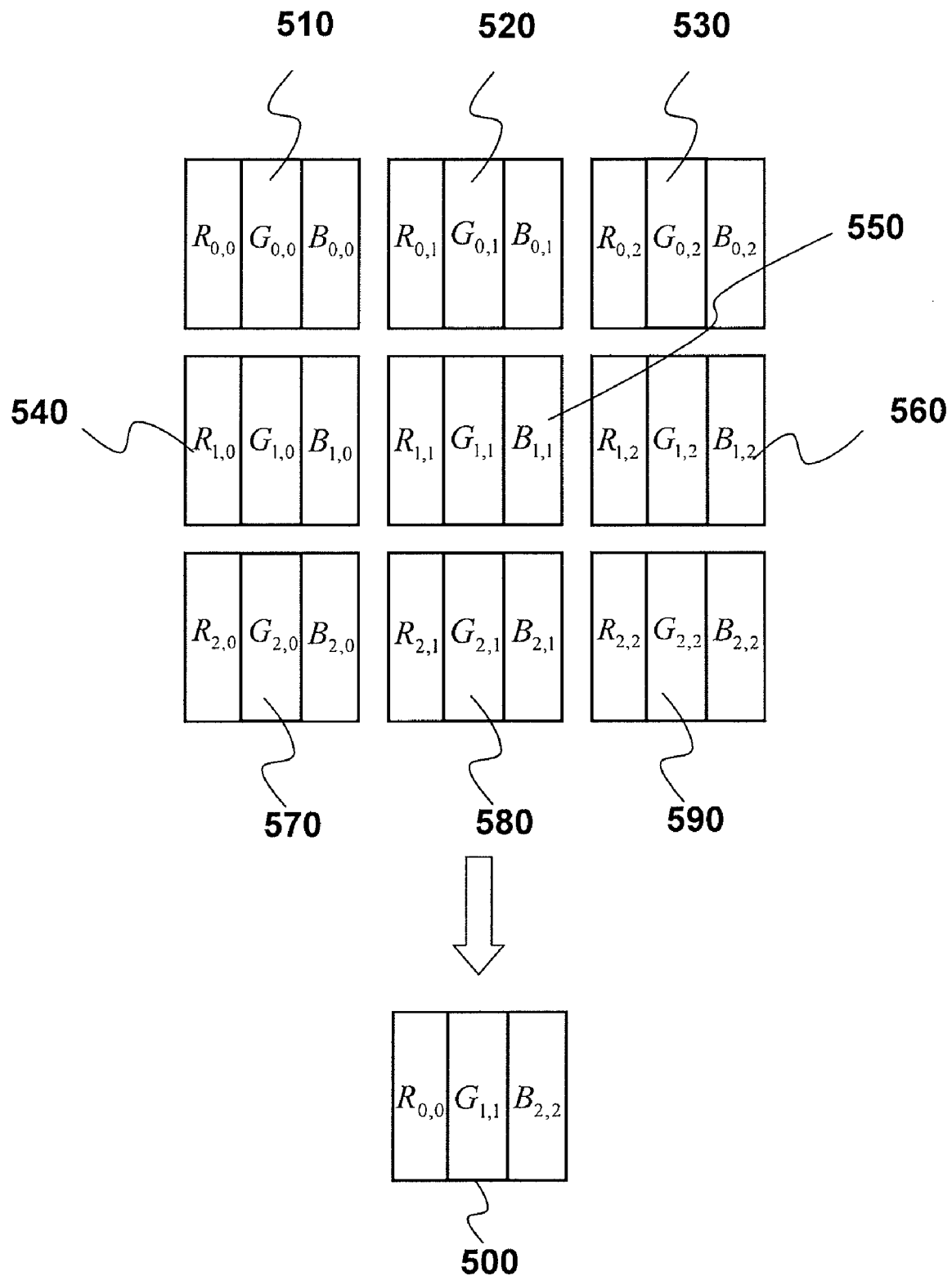
FIG. 5 shows an embodiment of subpixel-based down-sampling.

FIG. 5 shows an embodiment of subpixel-based down-sampling step according to an illustration of the claimed invention. Every pixel at (i,j) of an M×N image is made of subpixels ($R_{3i,3j}$, $G_{3i+1,3j+1}$, $B_{3i+2,3j+2}$) from a 3M×3N image. For example, at (0,0) in an M×N image, the R subpixel of pixel 500 at the location (0,0) of the M×N image is equal to the R subpixel of pixel 510 at the location (0,0) of the 3M×3N image, which is equal to $R_{0,0}$. The G subpixel of pixel 500 at the location (0,0) of the M×N image is equal to the G subpixel of pixel 550 at the location (0,0) of the 3M×3N image, which is equal to $G_{1,1}$. The B subpixel of pixel 500 at the location (0,0) of the M×N image is equal to the G subpixel of pixel 590 at the location (0,0) of the 3M×3N image, which is equal to $B_{2,2}$. In this way, subpixel-based downsampling is performed in a diagonal direction. A wide variety of ways are possible to implement subpixel-based down-sampling step 150. Different pixels are also used in addition to those along the diagonal direction of the 3M×3N image to obtain the R subpixel, G subpixel and B subpixel for a pixel 500 in the M×N image. For example, the R subpixel of pixel 500 is an average of R subpixels from pixels 520, 540, 560 and 580. Even if the pixels 510, 550, 590 from the 3M×3N image are used, it is possible to select different subpixels to obtain the R subpixel, G subpixel and B subpixel for a pixel 500. For example, the B subpixel is selected from the pixel 550 while the G subpixel is selected from the pixel 590.

Figure 6:
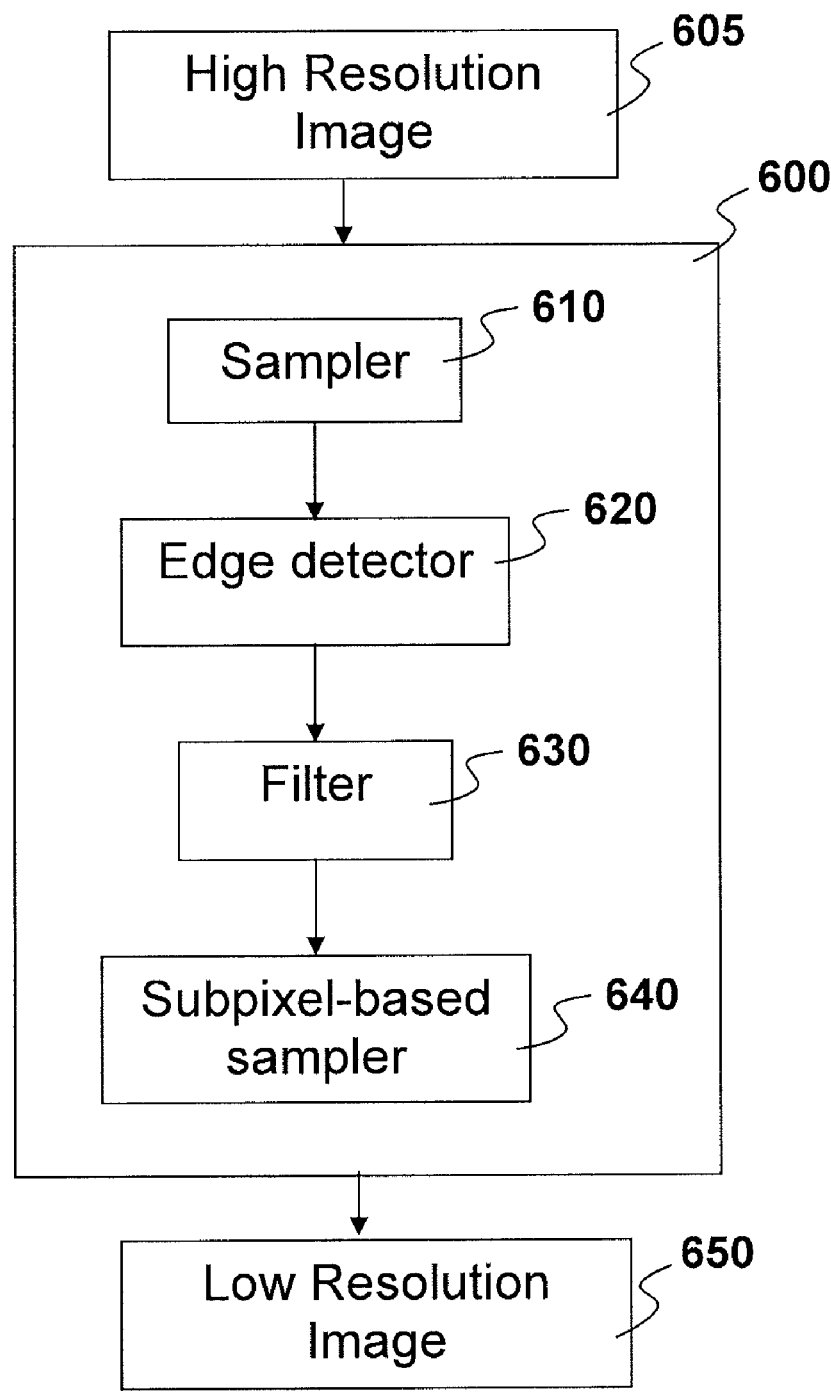
FIG. 6 shows a schematic representation of an apparatus implementing the claimed invention.

FIG. 6 shows a schematic representation of an apparatus implementing the claimed invention. The apparatus 600 is a display which in particular implementations can be of any type such as LCD, LED and OLED. The apparatus 600 incorporates a processor which in particular embodiments utilizes a Xilinx FPGA chip or an SoC ASIC chip designed for video down sampling in both pre-processing and post-processing. A high resolution image 605 is an input for the apparatus 600. The high resolution image 605 is subsequently processed by a sampler 610 to perform up-sampling or down-sampling to obtain the desired resolution for further processing as described above. After up-sampling or down-sampling, the image is processed by an edge detector 620 to identify the edges in the image and their directions by edge detection methods as described above. The image is processed by a filter 630 which performs an adaptive anti-aliasing filtering based on the edge detection results according to methods mentioned above. After filtering, the image is processed by a subpixel-based sampler 640 which performs subpixel-based down-sampling as described above to output a low resolution image 650.

The description of preferred embodiments of this claimed invention are not exhaustive and any update or modifications to them are obvious to those skilled in the art, and therefore reference is made to the appending claims for determining the scope of this claimed invention.

INDUSTRIAL APPLICABILITY

The claimed invention has industrial applicability in displaying high resolution image or video contents on low resolution hand-held devices such as portable multimedia players (PMPs) or personal digital assistants (PDAs). The claimed is also implemented on RGB-stripe LCD, LED, OLED or any other display type. The claimed invention is also applicable in various applications which requires down-sampling of images. Furthermore, the claimed invention is implemented in a Xilinx FPGA chip or an SoC ASIC chip designed for video down sampling in both pre-processing and post-processing.

What is claimed is:

1. A method for down-sampling an xM by yN image, comprising:
    sampling an xM by yN image into a 3M by 3N image;
    detecting one or more edges in the 3M by 3N image;
    determining a direction for each of the one or more edges;
    applying a filter adaptively on the 3M by 3N image based on the one or more edges and the direction determined for each of the one or more edges; and
    subpixel-based down-sampling the 3M by 3N image, after filtering, into a M by N image;
    wherein the direction determined for each of the one or more edges is one of a horizontal direction, a vertical direction, a left diagonal direction and a right diagonal direction;
    wherein said filter is applied in a direction orthogonal to the direction of an edge; and
    wherein said filter has a cutoff frequency greater than $\pi/3$ and less than $\pi$.

2. The method for down-sampling an xM by yN image as claimed in claim 1, wherein said filter has a cutoff frequency of $5\pi/12$.

3. The method for down-sampling an xM by yN image as claimed in claim 1, wherein subpixel-based down-sampling is performed in a diagonal direction.

4. An apparatus for down-sampling an xM by yN image, comprising:
    a sampler for sampling an xM by yN image into a 3M by 3N image;
    an edge detector for detecting one or more edges in the 3M by 3N image and determining a direction for each of the one or more edges;
    a filter for filtering adaptively on the 3M by 3N image based on the one or more edges and the direction determined for each of the one or more edges; and
    a subpixel-based sampler for down-sampling the 3M by 3N image, after filtering, into a M by N image on a subpixel basis;
    wherein the direction determined for each of the one or more edges is one of a horizontal direction, a vertical direction, a left diagonal direction and a right diagonal direction;
    wherein said filter is applied in a direction orthogonal to the direction of an edge; and
    wherein said filter has a cutoff frequency greater $\pi/3$ and less than $\pi$.

5. The apparatus for down-sampling an xM by yN image as claimed in claim 4, wherein said filter has a cutoff frequency of $5\pi/12$.

6. The apparatus for down-sampling an xM by yN image as claimed in claim 4, wherein said subpixel-based sampler performs subpixel-based down-sampling in a diagonal direction.

* * * * *